Aug. 31, 1965    J. ROSA ETAL    3,203,681
METHOD FOR HEAT TREATMENT OF POWDERED RAW MATERIAL
Filed Dec. 13, 1963    3 Sheets-Sheet 2
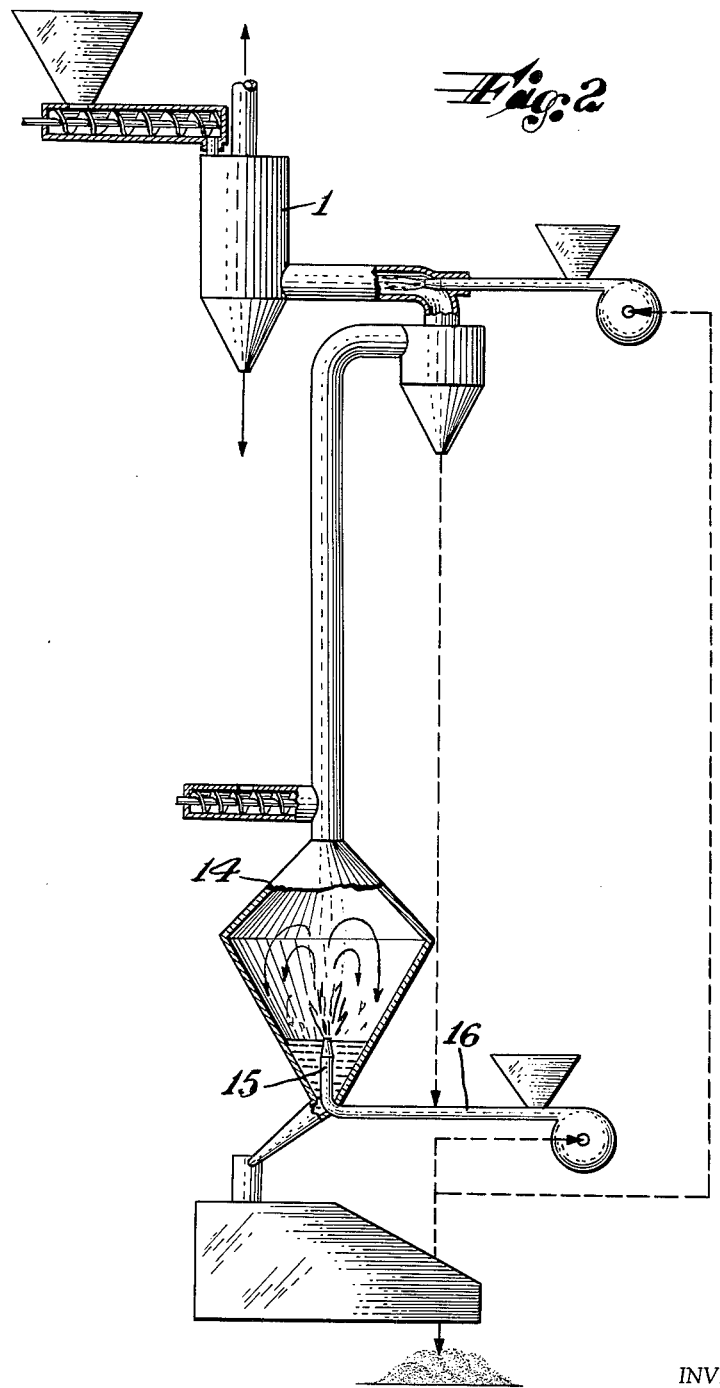
INVENTORS.
JOSEP ROSA
VLASTIMIL PETR
BY JIŘÍ SEČKÁŘ
ZDENĚK KOUPIL
JAROSLAV NOVÁK

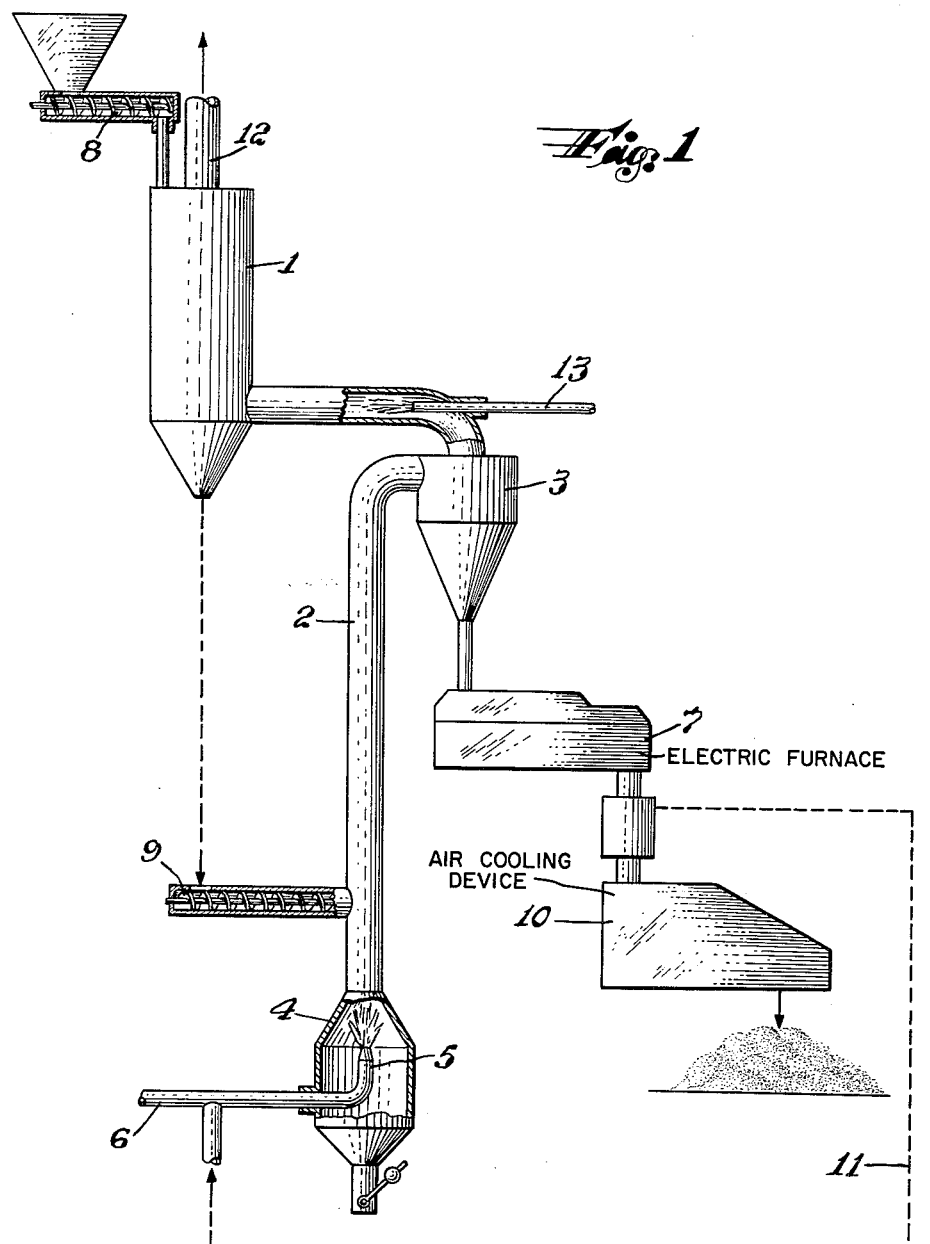

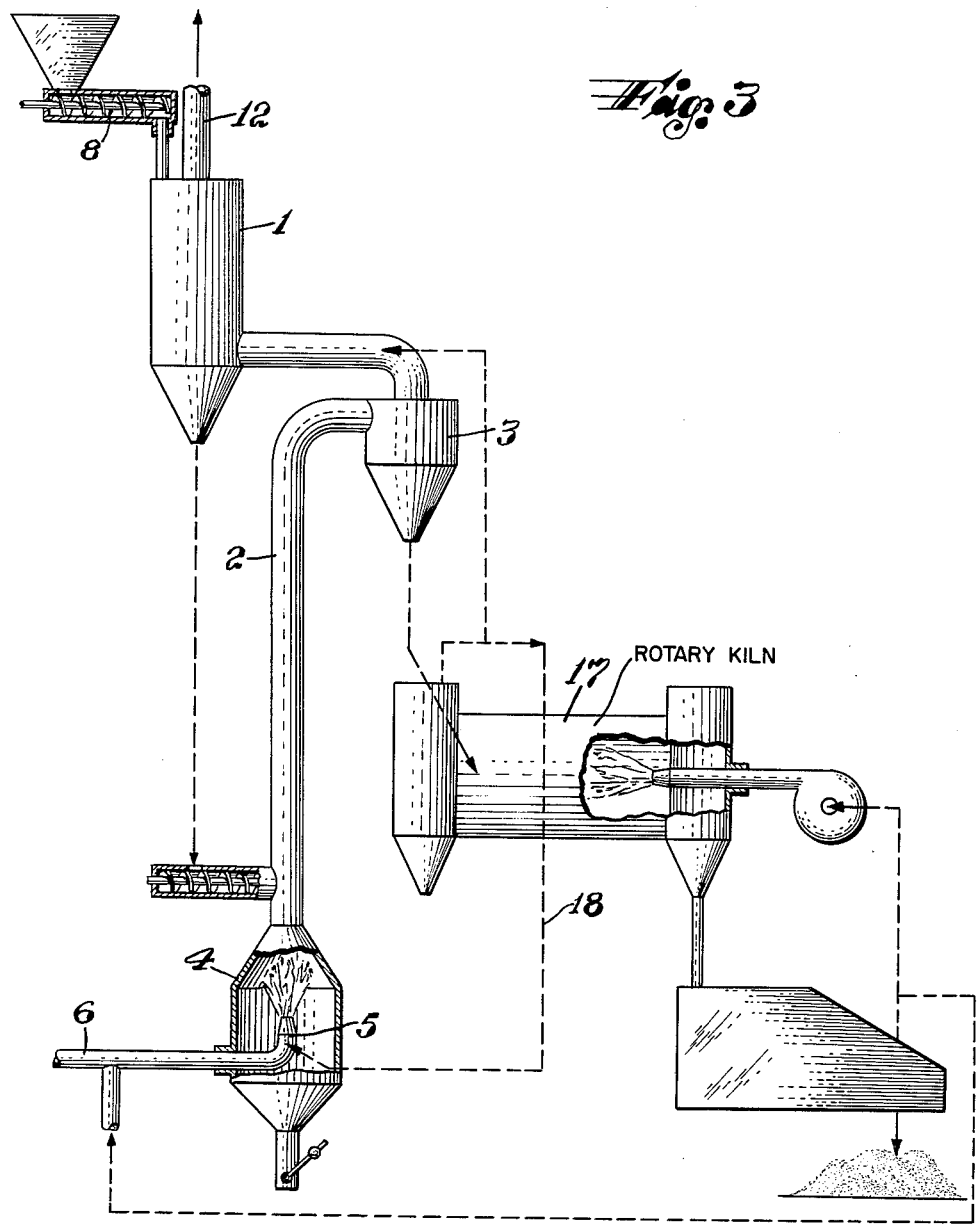

United States Patent Office 3,203,681
Patented Aug. 31, 1965

3,203,681
METHOD FOR HEAT TREATMENT OF
POWDERED RAW MATERIAL
Josef Rosa, 225 U Tisnova, Drasov, Czechoslovakia; and Vlastimil Petr, 123 Simackova; Jiří Sečkář, 20a Sumavska; Zdeněk Koupil, 78 Palackeho; and Jaroslav Novák, 5 Smitkova, all of Brno, Czechoslovakia
Filed Dec. 13, 1963, Ser. No. 330,349
Claims priority, application Czechoslovakia,
Dec. 15, 1962, 7,073/62
13 Claims. (Cl. 263—21)

This invention relates to the heat treatment of powdered mineral materials, and particularly to a method of making cement, and to an apparatus for carrying out the method.

In the manufacture of cement, a powdered mixture of raw materials including calcium carbonate is subjected to heat treatment in which the calcium carbonate is decomposed to calcium oxide and carbon dioxide, and the calcium oxide reacts with other ingredients of the mixture to form new compounds which constitute the clinker produced. The heat treatment proceeds in the following four stages:

(1) Up to about 800° to 900° C., the raw material may undergo a minor endothermic reaction, such as the dissociation of kaolin, but heat is mainly consumed for raising the temperature of the material. Heat consumption is about 420 calories per kilogram of clinker ultimately produced.

(2) At about 800° to 900° C., calcium carbonate is dissociated into calcium oxide and carbon dioxide at a heat consumption of about 450 cal./kg. clinker.

(3) New compounds are formed while the material is further being heated to 1450° C. (sintering temperature) or 1800° C. (melting temperature). The endothermic and exothermic reactions involved required 40 cal./kg. of sintered clinker or 270 cal./kg. of molten cement.

(4) The clinker or molten material is cooled and its sensible heat is recuperated.

The decomposition of calcium carbonate is conventionally performed either in a short rotary kiln equipped with a heat exchanger for preheating the raw material, and customary in the cement industry, or in a shaft furnace which is commonly employed in the lime industry. Neither apparatus provides a division of the several stages outlined above. It is common practice to supply thermal energy for the second and third stages of the process at the temperature level of the third stage which can be reached only by the use of high-quality fuel.

The conventional devices and methods do not provide efficient control of the heat treatment in the temperature range in which calcium carbonate decomposes, and the primary object of this invention is the provision of such control.

It is therefore an essential feature of this invention that the several stages of heat treatment are carried out in independent and separate zones, namely, a preheating zone in which the raw material is preheated to the dissociation temperature of the calcium carbonate, approximately 800° to 900° C.; a dissociation zone in which the heat supplied is consumed in the decomposition of calcium carbonate without substantial temperature increase of the solid material; and a sintering or melting zone in which the ultimate product is formed.

The replacement of the previously employed long rotary cement kiln by the more recent short kiln equipped with a heat exchanger for the incoming raw material reduced the consumption of thermal energy by about 30 to 40%. The instant invention permits the use of a rotary kiln still shorter than those heretofore employed, or replacement of the rotary kiln by a more economical device.

Other objects and advantages of the invention will hereinafter become more fully apparent from the following description of the annexed drawings which illustrate preferred embodiments, and in which:

FIG. 1 shows apparatus for manufacturing molten cement in an elevational view which is partly sectional, and partly conventional;

FIG. 2 illustrates a modification of the apparatus of FIG. 1; and

FIG. 3 shows yet another modification of the apparatus of FIG. 1.

Referring initially to FIG. 1, there is seen an upright heat exchanger 1. The bottom of the heat exchanger is connected to the top of an upright dissociation column 2 by a separator 3 of conventional design. The column 2 is a tube provided with a heat-insulating lining, and the separator 3 is similarly lined.

The bottom end of the column 2 communicates with a combustion chamber 4 equipped with a burner 5 to which fuel is supplied by a conduit 6. The solid discharge opening of the separator 3 is connected to an electric resistance furnace 7.

Pulverulent raw cement mix is fed to the top of the heat exchanger 1 by a screw conveyor 8, and passes from the heat exchanger to the bottom of the column 2 through a screw conveyor 9 which provides a seal against the escape of gases from the column. The raw material is preheated in the heat exchanger 1 to the dissociation temperature of calcium carbonate by the gases released from the separator 3. The preheated material makes contact with the combustion gases from the chamber 4 in the column 2 in parallel flow. The length of the column 2 and the amount of fuel burned in the chamber 4 are chosen in such a manner that the calcium carbonate is completely decomposed in the column, and the solids and gases reach the separator 3 at approximately equal temperature.

The burned solid material is discharged from the separator 3 into the furnace 7 where it is further heated to its melting temperature. The molten material passes to a cooling device 10 in which its temperature is reduced by a stream of air. The heat content of the spent cooling air is recovered by leading the hot air to the fuel supply conduit 6 through a pipe 11.

The hot gases separated from the solids in the separator 3 are fed to the heat exchanger 1 in which their heat content is transferred to the powdered raw material, and are released from the heat exchanger through a discharge conduit 12 which leads to a dust separator, not shown.

An auxiliary burner 13 is provided in the gas passage connecting the separator 3 to the heat exchanger 1 for heating the passing gases if necessary.

The economical use of thermal energy in the illustrated apparatus is due mainly to the features of the dissociation zone in which the largest amount of external heat is consumed. The combustion gases, while passing the column 2, are reduced in temperature from the combustion temperature of the fuel to the dissociation temperature of the calcium carbonate. The column 2 is a simple stationary device which can readily be insulated so as to reduce heat losses to the ambient air to a minimum. The thermal efficiency of the dissociation stage is approximately 90%. Fuel of relatively low quality may be burned in the chamber 4 because it is not necessary for the combustion gases to reach the sintering temperature of 1450° C.

No gas is liberated in the electric furnace, and no heat is lost by convection of escaping gas. Heat losses are essentially limited to those caused by conduction, and can readily be held low by insulating the furnace which is stationary.

Heat losses in modern heat exchangers are readily held to a constant rate of 20 to 30 cal./kg. clinker. The entire apparatus shown in FIG. 1 may thus be operated at an overall heat loss to the ambient atmosphere of less than 100 cal./kg. clinker. The corresponding heat losses in conventional rotary kilns are between 200 and 300 cal./kg. clinker.

The simple stationary furnace 7 which replaces the rotary kiln of the usual cement plant is less costly to build and to operate. Research work still in progress indicates that cement made from the molten product discharged from the furnace has higher strength than cement manufactured from clinker in the conventional method.

If high-grade fossil fuel is available, the apparatus described above may be modified to avoid the use of an electric furnace, as is shown in FIG. 2.

The pre-heating and dissociation stages employ the same equipment as was described with reference to FIG. 1. The combustion chamber 4 is replaced by a melting chamber 14 which is directly connected with the lower end of the dissociation column 2. Burners 15, of which only one is shown in the drawing, are provided with fuel through a conduit 16 to which the solids discharged from the separator 3 are also fed.

The mixture of fuel and partly decomposed raw material enters the chamber 14 through the burner 15, and the fuel is ignited. The solid mineral particles are quickly heated to their melting temperature, coalesce, and drop to the bottom of the chamber 14 from which they flow to the cooling device 10.

Common cement clinker may also be manufactured by the method of the invention in modified equipment illustrated in FIG. 3 which differs from that shown in FIG. 1 by the substitution of a rotary kiln 17 for the electric resistance furnace. The ratio of length to diameter in the kiln 17 is between 1:3 and 1:6. The thermal energy supplied to the kiln 17 is only employed for sintering the burned material discharged from the separator 3.

The combustion gases formed in the kiln 17 in a conventional manner may be led to the column 2 or the heat exchanger 1 through a conduit 18, thus reducing the thermal load of the burner 4. The heated air recovered in the cooling device 10 may be employed in a conventional manner as primary air of combustion for the several burners as indicated by broken lines in FIGS. 2 and 3, and described above with reference to FIG. 1.

It is a common feature of the several illustrated embodiments of the invention that the pulverulent raw material is heat treated in several separate stages in which a readily controlled amount of heat is supplied at a readily controlled temperature.

Fuel of inferior quality may therefore be employed for supplying the thermal energy for the stages which operate at relatively low temperature. Stationary pieces of equipment may be employed in all or most stages of the process with a resulting saving in first cost and operating expense. The process may readily be automated in a manner obvious to those skilled in the art, thus providing savings in manpower.

While the invention has been described with particular reference to the manufacture of cement, it will be appreciated that it is not limited to the specific raw material treated. The method and apparatus disclosed are readily adapted for the thermal treatment of limestone and other materials similar in their characteristics to the raw material employed in cement manufacture.

We claim:

1. A method of heat treating a pulverulent raw material containing calcium carbonate and capable of sintering at a temperature higher than the dissociation temperature of said calcium carbonate which comprises:

(a) burning a fuel to produce a stream of hot combustion gas, said stream constituting a first source of thermal energy and having a temperature higher than said dissociation temperature;
  (b) preheating said raw material to a temperature substantially equal to said dissociation temperature;
  (c) suspending the preheated material in said stream in a first heating zone until burned by dissociation of said calcium carbonate while said combustion gas is cooled substantially to said dissociation temperature, and while the temperature of the material remains substantially unchanged; and
  (d) contacting said burned material in a second heating zone spaced from said first zone while at said substantially unchanged temperature with a second source of thermal energy until the burned material is heated at least to the sintering temperature thereof.

2. A method as set forth in claim 1, wherein said preheated material is suspended in a portion of said stream while said portion has a temperature substantially equal to the temperature of combustion of said fuel.

3. A method as set forth in claim 1, wherein said burned material is thermally contacted with said second source until heated to the melting temperature thereof.

4. A method as set forth in claim 1, wherein said cooled gas is passed through a preheating zone, and said raw material is passed through said preheating zone separately from said cooled gas in thermal contact therewith.

5. A method as set forth in claim 1, wherein said burned material is separated from said cooled gas and is led to said second heating zone while spaced from said stream and from said cooled gas for thermal contact with said second source in said second heating zone.

6. A method of heat treating a pulverulent raw material containing calcium carbonate and capable of sintering at a temperature higher than the dissociation temperature of said calcium carbonate which comprises:

(a) burning a fuel to produce a stream of hot combustion gas, said stream constituting a first source of thermal energy and having a temperature higher than said dissociation temperature;
  (b) passing said raw material through a preheating zone and heating said material in said zone to a temperature substantially equal to said dissociation temperature;
  (c) suspending the preheated material in a portion of said stream having a temperature substantially equal to the combustion temperature of said fuel until the material is burned by dissociation of said calcium carbonate, while maintaining said material substantially at said dissociation temperature and, until said combustion gas is cooled substantially to said dissociation temperature;
  (d) separating said burned material from said cooled gas, and leading said material to a heating zone spaced from said stream and from said cooled gas;
  (e) passing the separated cooled gas through said preheating zone while separate from said raw material and in thermal contact therewith for preheating the same; and
  (f) contacting said burned material in said heating zone with a second source of thermal energy until the burned material is heated at least to the sintering temperature thereof.

7. A method as set forth in claim 6, wherein said raw material constitutes a cement mix.

8. A method as set forth in claim 6, wherein said burned material is melted in said heating zone.

9. A method as set forth in claim 6, wherein said fuel while burning constitutes said second source of thermal energy.

10. In an apparatus for heat treating a pulverulent material, in combination:

(a) preheating means for preheating said pulverulent material;
(b) an upright column, said preheating means communicating with a bottom portion of said column for passage of the preheated material into said column;
(c) a combustion chamber communicating with said bottom portion;
(d) burner means in said chamber for burning a fuel to a hot combustion gas, whereby said gas passes upward through said column, entrains the preheated material, and burns the entrained material while being cooled thereby, said burner means and said combustion chamber constituting first heating means;
(e) separator means communicating with a top portion of said column for separating said burned material from said cooled gas, said separator means having a discharge opening for discharge of the separated burned material; and
(f) second heating means spaced from said first heating means and communicating with said discharge opening for receiving said burned material and for further heating the same.

11. In an apparatus as set forth in claim 10, said second heating means including an electric furnace.

12. In an apparatus as set forth in claim 10, said second heating means including a rotary kiln.

13. An apparatus as set forth in claim 10, wherein said preheating means include a heat exchanged and means connecting said separator means to said preheating means for passage of said separated cooled gas through said heat exchanger in thermal contact with the pulverulent material.

References Cited by the Examiner

UNITED STATES PATENTS

| | | | |
|---|---|---|---|
| 2,757,921 | 8/56 | Petersen | 263—52 |
| 2,797,077 | 6/57 | Muller | 263—32 |
| 2,860,174 | 11/58 | Begley et al. | 263—19 X |
| 2,965,366 | 12/60 | O'Mara et al. | 263—32 |
| 2,991,062 | 7/61 | Rees et al. | 263—53 |
| 3,013,786 | 12/61 | Pyzel | 263—53 |
| 3,037,940 | 6/62 | Pixley et al. | 263—21 X |

FOREIGN PATENTS 1,240,786   10/59   France.

WILLIAM F. O'DEA, *Acting Primary Examiner.*
JOHN J. CAMBY, CHARLES SUKALO, *Examiners.*